United States Patent Office 3,741,941
Patented June 26, 1973

3,741,941
POLYESTERS WITH TERMINAL POLYHYDROXY GROUPS
Thomas A. Ashe, Wilmington, Del., assignor to E. I. du Pont de Nemours and Company, Wilmington, Del.
No Drawing. Continuation-in-part of application Ser. No. 776,750, Nov. 18, 1968. This application Mar. 3, 1971, Ser. No. 120,772
Int. Cl. C08g 17/14
U.S. Cl. 260—78.3 R     5 Claims

ABSTRACT OF THE DISCLOSURE

Polyesters represented by the general structure $$AZ {\left[ OX\overset{O}{\underset{\|}{C}} \right]}_n OD$$

useful aa film-formers in coating compositions.

CROSS-REFERENCE TO RELATED APPLICATIONS

This application is a continuation-in-part of application Ser. No. 776,750, filed Nov. 18, 1968, and now abandoned.

STATEMENT OF THE INVENTION

This invention relates to polyesters. It is more particularly directed to polyesters represented by the structure $$AZ {\left[ OX\overset{O}{\underset{\|}{C}} \right]}_n OD$$

where A is $$HOCH_2-\underset{OH}{\underset{|}{\overset{H}{\underset{|}{C}}}}-CH_2-,\ HOCH_2\underset{OH}{\underset{|}{\overset{H}{\underset{|}{C}}}}-CH_2OCH_2\underset{OH}{\underset{|}{\overset{H}{\underset{|}{C}}}}-CH_2-,$$

$$\underset{HOCH_2}{\overset{HOCH_2}{\diagdown}}C-CH_2-,\ \underset{HOCH_2}{\overset{HOCH_2}{\diagdown}}C-\underset{H}{\overset{H}{\underset{|}{C}}}-O-\underset{H}{\overset{H}{\underset{|}{C}}}-\underset{CH_2OH}{\overset{CH_2OH}{\underset{|}{C}}}-CH_2-,$$

$$\underset{HO\ \ \ OH}{\overset{HO\ \ \ OH}{\diagup\diagdown}}\!\!\left\langle S \right\rangle\!\!\underset{\ }{\ },\ HOCH_2\underset{OH}{\underset{|}{\overset{H}{\underset{|}{C}}}}\!\!-\!\!(CH_2)_4-,$$

$$\underset{HOCH_2}{\overset{HOCH_2}{\diagdown}}\underset{CH_3}{\underset{|}{C}}-CH_2-,\ H{\left[ \underset{CH_2OH}{\underset{|}{\overset{H}{\underset{|}{C}}}}-CH_2 \right]}_{3-20}$$

$$H{\left[ \underset{OH}{\underset{|}{CH}}-CH_2 \right]}_{3-50}$$

Z is an organic linking radical;
X is an alkylene radical of 2 through 18 carbon atoms;
D is hydrogen or an alkyl radical of 1 through 18 carbon atoms; and
n is a number 10 through 500.

UTILITY

The polymers of the invention are useful as film-formers in coating compositions, particularly when combined with a second polymer having complementary reactive groups. Illustrative of such second polymers are heat reactive phenolics, polyglycidyl ethers and esters, polyisocyanate resins, butylated urea/formaldehyde resins and melamine/formaldehyde/alkanol resins.

The polymers of the invention can be used as film-formers by mixing from about 55 to about 95 parts of the polymer with from about 5 to 45 parts of the second complementary polymer, in a suitable solvent. This solution can then be used directly to give clear coatings or it may be pigmented as desired.

The coating composition can be applied conventionally and is preferably then baked for from about 10 to 30 minutes at 80-200- C.

The polymers of the invention are also useful as aids for dispersing solid particles in organic liquids. They are especially useful as aids for dispersing pigments in organic liquids. Illustrative of the pigments which can be dispersed are titanium dioxide, carbon black, zinc oxide, lead titanate, potassium titanate, antimony oxide, lithopone, phthalocyanine blue, toluidine red, quinacridone and the like.

Pigment dispersions made with polymers of the invention are remarkably resistant to flocculation, which gives the paints into which the dispersions are incorporated higher initial gloss, better hiding and tinting strength, and makes them resistant to color drift and gloss loss. These pigment dispersions can also be used satisfactorily with many more diverse types of paints than conventional pigment dispersions. Moreover, a dispersion made with a polymer of the invention can have a significantly higher pigment content, while retaining the same degree of fluidity, than when conventional aids are used.

The polymers of the invention can be used as pigment dispersing aids by dissolving from 0.001 to about 2.00 grams of polymer per square meter [1] of surface of the pigment to be used, preferably 0.004 to about 0.100 gram per square meter, in an organic liquid compatible with the paint into which the pigment dispersion is to be incorporated. Illustrative of organic liquids which can be used are aliphatic and aromatic hydrocarbon ethers, esters, ketones, alcohols, and mixtures of these.

An appropriate amount of pigment is then added to this solution, which is then subjected to shear, as by sand-grinding or ball-milling, to deagglomerate and disperse the pigment. This pigment dispersion or mill-base can be then added directly to a paint.

Polymers of the invention preferred for use as pigment dispersing aids are those whose preparation is shown in Examples 1, 2 and 3.

The polymers of the invention are also useful for dispersing magnetic oxides such as iron oxide and chromium dioxide in compositions used to prepare magnetic tape. Use of 0.5–10%, by weight of such a composition, of a polymer of the invention promotes wetting of the oxide, improves adhesion of the composition to the tape substrate and improves the tape's magnetic properties.

PREPARATION OF THE POLYMERS

Preparation of the polymers of the invention can be more easily shown if it is first explained that structurally the polymer molecule divides itself naturally into three segments.

The first of these, the A segment, is derived from a polyhydroxy compound.

The second, the —Z— segment, is an organic linking radical which serves only to link the other two segments of the molecule together.

The third, the $$ {\left[ O-X-\overset{O}{\underset{\|}{C}} \right]}_n OD$$

segment, is derived from a polyester.

The polyhydroxy and polyester segments are separately prepared and then linked together through a suitable linking reactant to form the polymers of the invention.

Illustrative of the polyhydroxy compounds suitable for use are glycerol, pentaerythritol, diglycerol, dipentaery- ---
[1] Measured by the Brunauer, Emmett and Teller nitrogen adsorption method described on page 30 of "Colloidal Dispersions" by Earl K. Fischer, published by John Wiley and Sons in 1950.

thritol, inositol, trimethylol propane, trimethylol ethane, butanetetrol, hexanehexitol, polyallyl alcohol and polyviny alcohol.

The polyester segment can be prepared by any of the well-known polyester forming reactions. Illustrative of these are
(1) polymerization of lactones such as propiolactone, caprolactone and pivalolactone, and
(2) condensation of hydroxy acids such as α,ω-hydroxypropionic acid, α,ω-hydroxydecanoic and 12-hydroxystearic acid.

These reactions, as well as others, are described and greater detail in "Preparative Methods of Polymer Chemistry," Sorenson and Campbell, Interscience Publishers, Inc. New York, N.Y. (1961), pp. 111–127 and 242–247 and "Polyesters and Their Applications," Bjorksten Research Laboratories, Inc., Reinhold Publishing Corp., New York, New York, N.Y. (1956).

The polyester segment must then be modified so that it can be linked to the polyhydroxy segment. An illustrative modifying reaction (which introduces a linking radical, Z, into the final polymer molecule) is

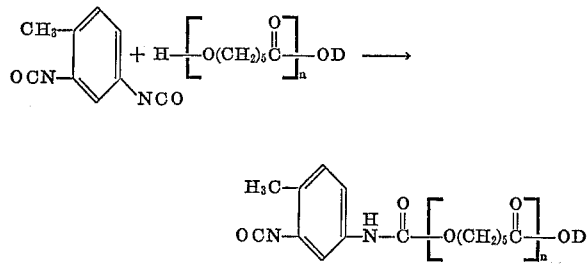

In this reaction, stoichiometric quantities of the reactants are dissolved in a solvent like toluene containing 0.1% by weight of dibutyl tin dilaurate. This is then heated for 2 hours at 100–150° C.

The poly-hydroxy compound is dissolved in a solvent (miscible with that used to dissolve the reactants in the step just described) such as dimethylformamide or ethylene glycol dimethyl ether. This solution is added to the solution of modified polyester and the mixture is then refluxed for from 1 to 8 hours.

The resulting polymer of the invention can be isolated by stripping off the solvent under reduced pressure.

The physical properties of the polymers of the invention thus prepared range from viscous liquid to friable solid. They are soluble in common organic liquids such as toluene, ethyl acetate, tetrahydrofuran, acetone, hexane, cyclohexane and dimethylformamide.

EXAMPLES

The following examples are submitted so that the invention may be more readily understood and practiced. Those skilled in the art will no doubt be able to compose numerous variations on their central theme, such as the attachment of innocuous substituents. It is naturally considered that these variations are a part of the invention.

In the examples all parts are by weight unless otherwise indicated.

EXAMPLE 1

Six hundred parts of hydroxy-terminated polycaprolactone (molecular weight 3000), 1200 parts of toluene, 34.8 parts of 2,4-toluene diisocyanate and 1 part of dibutyl tin dilaurate were refluxed (120° C.) under anhydrous conditions for two hours. The mixture was cooled to room temperature and 1200 parts were added to a mixture of 27 parts of pentaerythritol, 1 part of dibutyl tin dilaurate and 500 parts of dimethyl formamide. The mixture was then refluxed (120° C.) for two hours, cooled to room temperature and poured into 15,000 parts of methanol.

The precipitated product was filtered off and dried at 60° C. in vacuo. It had the structure

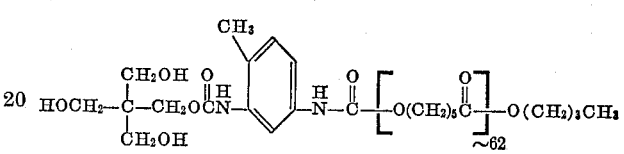

Example 2

Thirty parts of hydroxy-terminated polycaprolactone (molecular weight 3000) dissolved in 70 parts of toluene were added to 1.7 parts of 2,4-toluene diisocyanate and 0.5 part of dibutyl tin dilaurate at 120° C. over a period of two hours. The mixture was refluxed (120° C.) for ½ hour after addition was complete.

The mixture was then added to to 340 parts of anhydrous dimethylformamide containing 85 parts of dipentaerythritol and heated one hour at 120° C. The solvent was stripped at 100° C. and 20 mm. of pressure, leaving behind a solid residue. This was washed several times with boiling water to remove unreacted dipentaerythritol.

The washed product was then dissolved in 350 parts of benzene and azeotroped to eliminate water.

The resulting solution was stripped of solvent at 100° C. and 20 mm. of pressure to give a polymer having the structure

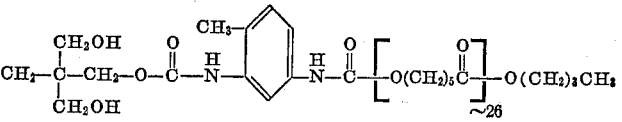

Example 3

One hundred fifty parts of 12-hydroxystearic acid, 3.25 parts of 2-ethylhexyl alcohol, 10 parts of xylene and 1 part of p-toluene sulfonic acid were charged to a reactor. The reaction mixture was heated to reflux and xylene distilled off until the flask contents reached 175° C. The mixture was then refluxed at 175° C. for 8 hours, while 8.5 parts of water were collected.

The mixture was cooled to room temperature and 150 parts of ethylene glycol dimethyl ether, 4.35 parts of 2,4-toluene diisocyanate and 0.1 part dibutyl tin dilaurate were added. This mixture was heated for three hours at 100° C., and then 6.35 parts of dipentaerythritol were added and the mixture heated another three hours.

The product, a sticky resin, was isolated by stripping off solvent at 100° C. and 20 mm. of pressure. It had the structure

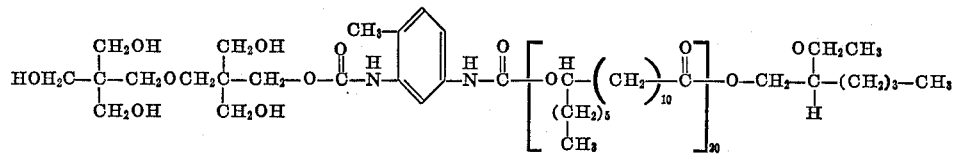

Example 4

Freshly distilled β-propiolactone, 360 parts, and anhydrous butanol, 3.7 parts, were mixed, heated for 15 hours at 170° C. and then cooled to room temperature. Seventy parts of the resulting solid polyester were dissolved in 200 parts of anhydrous dibutyl carbitol and added to a flask containing 1.74 parts of 2,4-toluene diisocyanate and 0.1 part of dibutyl tin dilaurate. The mixture was heated for two hours at 100° C., cooled and 1.74 parts of inositol dissolved in 50 parts of anhydrous dimethylformamide were added.

This was heated two hours at 100° C. and the product isolated by stripping off the solvent at 100° C. and 20 mm. of pressure.

The resulting product was a solid with the structure

[structure diagram]

What is claimed is:

1. A polymeric material of the formula $$AZ\left[OX\overset{O}{\underset{\|}{C}}\right]_n OD$$

where
A is

[structural formulas for A groups including HOCH$_2$-CH-CH$_2$-, HOCH$_2$-CH$_2$OCH$_2$-CH-CH$_2$-, (HOCH$_2$)$_3$C-CH$_2$-, (HOCH$_2$)$_3$C-CH-O-CH-C(CH$_2$OH)-CH$_2$-, inositol, HOCH$_2$-CH(OH)-(CH$_2$)$_4$-, (HOCH$_2$)$_2$C(CH$_3$)-CH$_2$-, and H-[CH(CH$_2$OH)]$_{8-20}$-]

or $$H-\left[\underset{OH}{\underset{|}{CH-CH_2}}\right]_{3-50}$$

Z is a dicarbamate radical;
X is an alkylene radical of 2 through 18 carbon atoms;
D is hydrogen or an alkyl radical of 1 through 18 carbon atoms; and
n is a number 10 through 500.

2. The polymeric material of claim 1 wherein D is alkyl of 3 through 10 carbon atoms and n is 10–200.

3. The polymeric material of claim 1 having the formula

[structure diagram]

4. The polymeric material of claim 1 having the formula

[structure diagram]

5. The polymeric material of claim 1 having the formula

[structure diagram]

References Cited
UNITED STATES PATENTS

| | | | |
|---|---|---|---|
| 2,890,208 | 6/1959 | Young et al. | 260—78.3 |
| 2,977,385 | 3/1961 | Fowler et al. | 260—475 |
| 2,990,379 | 6/1961 | Young et al. | 260—2.5 |
| 3,294,713 | 12/1966 | Hudson et al. | 260—2.5 |
| 3,488,302 | 1/1970 | Pyron | 260—9 |

WILLIAM H. SHORT, Primary Examiner
E. A. NIELSEN, Assistant Examiner

U.S. Cl. X.R.
106—308; 260—29.6 NR, 77, 482 B, 830 R 838